United States Patent [19]

Hillström et al.

[11] Patent Number: 4,534,631
[45] Date of Patent: Aug. 13, 1985

[54] SLIDE GUIDE ADJUSTING DEVICE AT SLIDE PROJECTOR

[75] Inventors: Kennert E. G. Hillström, Mölnlycke; Rolf G. Fransson, Angered, both of Sweden

[73] Assignee: Victor Hasselblad Aktiebolag, Gothenburg, Sweden

[21] Appl. No.: 520,539

[22] Filed: Aug. 5, 1983

[30] Foreign Application Priority Data

Aug. 9, 1982 [SE] Sweden .............................. 8204621

[51] Int. Cl.³ .............................................. G03B 1/50
[52] U.S. Cl. ........................................ 353/95; 353/69
[58] Field of Search .................... 353/95, 96, 122, 22, 353/23, 69, 70, 103, 104

[56] References Cited

U.S. PATENT DOCUMENTS 2,023,970 12/1935 Newman ........................... 353/70 X
3,114,285 12/1963 Harris ..................................... 353/69

FOREIGN PATENT DOCUMENTS 398433 7/1924 Fed. Rep. of Germany ........ 353/69

Primary Examiner—Harry N. Haroian
Attorney, Agent, or Firm—Sherman & Shalloway

[57] ABSTRACT

The invention relates to a device at a slide projector for adjusting the slide guide in a plane perpendicular to the optical axis (A—A) of the projector. First fixing means (6-8) are provided to connect a central portion of a first side of the slide guide (2) to the projector. Second and third fixing means (9-15) are located separated from each other on a side of the slide guide (2) opposed to said first side to connect the slide guide to the projector, which second and third fixing means (9-15) are capable to independently of each other adjust and fix the slide guide in the direction of the optical axis (A—A).

4 Claims, 2 Drawing Figures

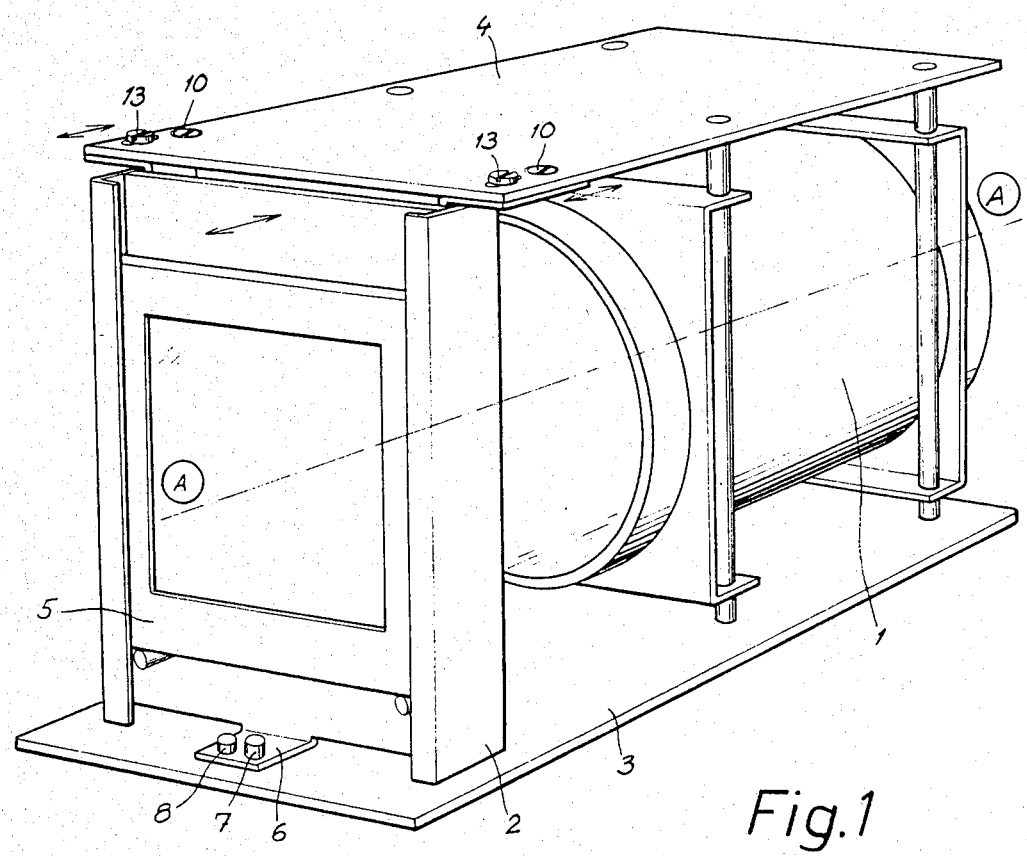
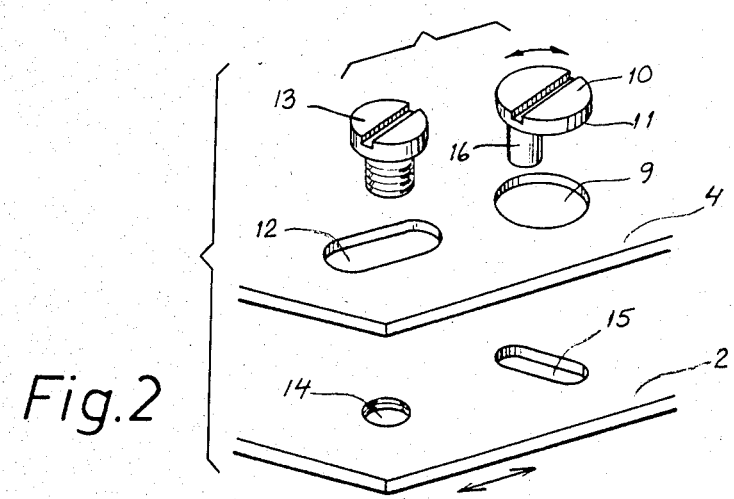

SLIDE GUIDE ADJUSTING DEVICE AT SLIDE PROJECTOR

This invention refers to slide projectors and relates to a device for accurately setting or adjusting the slide plane of the projector perpendicularly to the optical axis of the projector.

The optical quality of a slide projector depends to a great extent on the degree of success in orienting the slide plane perpendicularly to the optical axis. This implies that, at normal manufacturing tolerances of the components comprised in the system, the slide plane may have to be adjusted by up to ±0.5 mm. Known projectors are not equipped with special setting or adjusting devices for this purpose. Adjustment, therefore, is made by using suitable tools for bending and curving components found to be too long for yielding a fully satisfactory orientation of the slide plane. It is very difficult, however, to achieve the desired precision, because the components in question may not be easily accessible, and it may be difficult to calculate their resilience. The requirements for a correct position of the slide plane are still higher for slide projectors intended for a picture size exceeding the miniature size 24×36 mm.

The present invention has an object to solve the problem of achieving high accuracy for the adjustment of the slide guide, and thereby the slide plane in relation to the optical axis of the projector. This object is achieved in that the invention has been given the characterizing features defined in the attached claims.

BRIEF DESCRIPTION OF THE DRAWINGS

FIG. 1 is a perspective view of the present invention used with a frame for a slide projector, which comprises a stand including a lens holder of the slide projector and its slide guide, and FIG. 2 is a blown-up view of the details of the adjusting device of the slide guide in its disassembled state.

SPECIFIC DESCRIPTION OF THE PREFERRED EMBODIMENTS

The slide projector comprises a unit, which includes a lens holder 1 and a slide gear 2, which are mounted between a lower and an upper stand plate 3 and, respectively, 4.

The guide 2 for slide frames 5 is provided at its bottom with a centrally located tongue 6, which by a hole is located rotatably on a pin 7 fastened in the lower stand plate 3, FIG. 1. In order to fix the tongue 6 in adjusted position, a locking screw or set screw 8 is provided which extends through a relatively spacious opening (not shown) in the tongue 6 and into a threaded hole in the lower stand plate 3. The slide guide 2 is upwardly attached adjustably at its outer edges by two mutually identical fixing means, one of which is shown in greater detail in FIG. 2. In the upper stand plate 4, a circular opening 9 for an adjusting screw 10 and an oblong clearance hole 12 for the locking screw 13 are located. The head 11 of said adjusting screw 10 is mounted rotatably in the opening 9, and said hole 12 extends along the optical axis A—A. In the slide guide 2 a threaded hole 14 for the locking screw 13 and an oblong opening 15 for the eccentrically located pin 16 of the adjusting screw 10 are provided. Said opening 15 extends across the optical axis A—A.

When the adjusting screw 10 is being turned, the slide guide 2 moves only in the direction of the optical axis, owing to the orientation of the oblong hole 12.

When adjusting the slide guide 2 for positioning the plane of the slide frame 5 perpendicular to the optical axis A—A of the system, instead of the slide frame 5 a mirror is attached in the slide guide 2, and the device is placed into a collimator. The locking screws 8 and 13 are unscrewed, whereafter the slide guide 2 by turning it about the pin 7 is inclined from the lens holder 1, then, by turning the respective adjusting screw 10, the slide guide 2 assumes the correct position. Thereafter the locking screws 8 and 13 are tightened.

Although the embodiment described above and shown should be the most suitable and expedient one, it is, of course, possible to attach the locking means on the vertical opposed sides of the slide guide 2, and it is, of course, not necessary to position the fixing means 6–8 centrally on the lower side, nor is it necessary to position the fixing means 9–15 outermost at the edges of the upper side of the slide guide.

The adjusting screw 10 provided with the eccentric pin 16 can be retained in place by means of a leaf spring or the like (not shown), or the screw may be detachable and be used only at the adjusting of the slide guide 2 which normally is carried out only once.

What is claimed is:

1. A device for use with a slide projector having a slide guide for adjusting the slide guide in a plane perpendicular to the optical axis of the projector, characterized in that said device comprises a first fixing means to connect a limited portion of a first side of the slide guide to a first stationary portion of the projector, a second fixing means located at a portion of a side of the slide guide opposed to said first side to connect the guide to a second stationary portion of the projector, and third fixing means located at another portion of said opposed side of the slide guide to connect the guide to a third stationary portion of the projector, said second and third fixing means being capable of adjusting and fixing the orientation of said slide guide in the direction of the optical axis independently of one another.

2. A device as defined in claim 1, characterized in that the second and third stationary portions are located adjacent respective outer edges of sides of the slide guide in assembly and said second and third fixing means are identical, each of said second and third fixing means comprising a threaded hole in the slide guide for co-operation with a locking screw extending through a further hole in the respective second or third stationary portion of the projector, which further hole is oblong in the direction of said optical axis, an opening located in the slide guide, which opening is oblong across the direction of the optical axis, and with which a pin engages, said pin being located eccentrically on a circular-cylindrical head mounted rotatably in a further circular opening in the stationary portion whereby rotation of said head in said further circular opening moves said pin in said opening and thereby moves slide guide in the direction of said optical axis.

3. A device as defined in claim 1 or 2, characterized in that the first fixing means are located substantially centrally of the first side and consist of a portion provided with a hole and engaging with a first fixing means pin located at the first stationary portion, and an opening located in said first stationary portion, through which opening a set screw extends with clearance for being screwed into the first stationary portion.

4. A device as defined in claim 1 or 2, characterized in that the first fixing means are located at a lower side of the slide guide, and the second and third fixing means are located at an upper side of the slide guide.

* * * * *